Feb. 19, 1957  F. M. PARKER, JR  2,781,659
SPEEDOMETER TESTERS
Filed Nov. 17, 1953
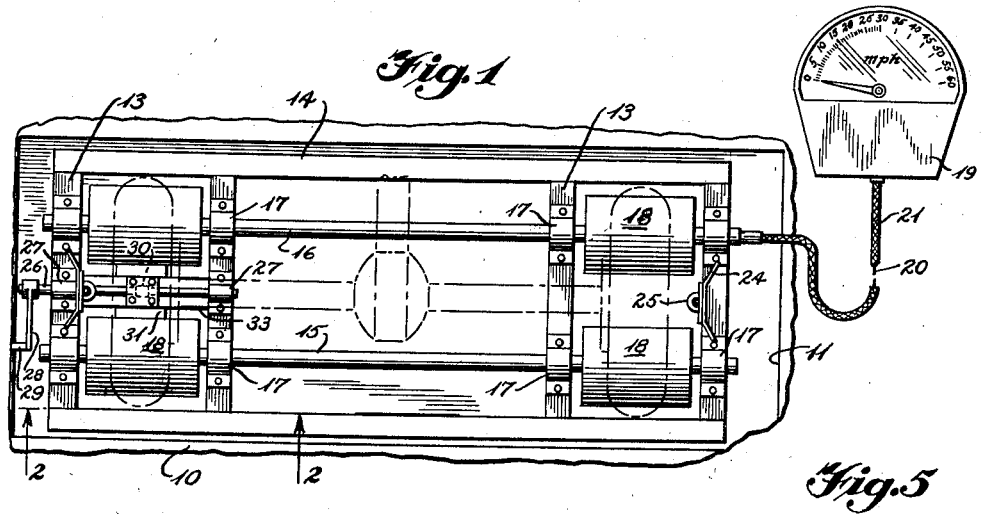
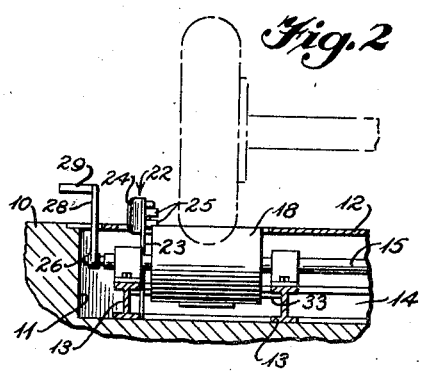
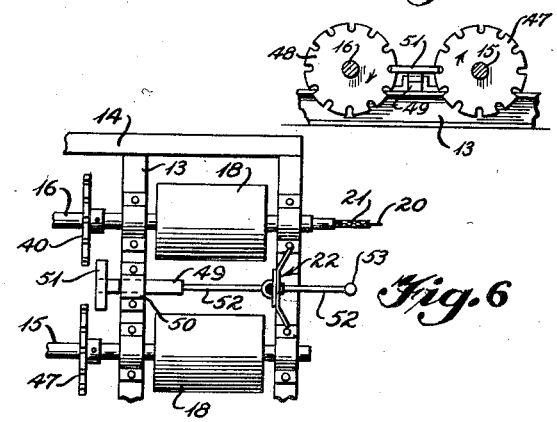
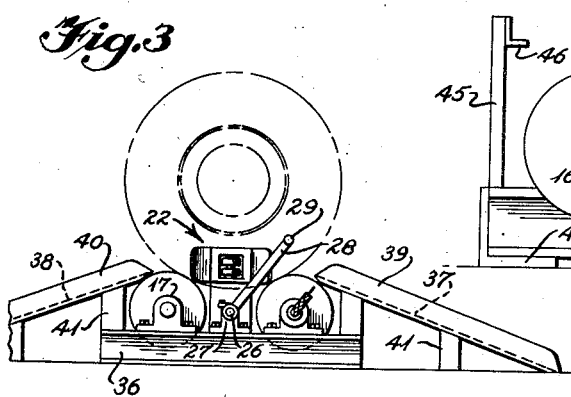
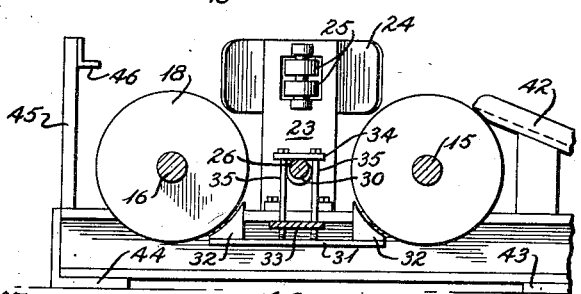
INVENTOR
Frank M. Parker, Jr.
-deceased
BY Phyllis A. Parker, executrix
BY
ATTORNEY

United States Patent Office 2,781,659
Patented Feb. 19, 1957

2,781,659

SPEEDOMETER TESTERS

Frank Moorman Parker, Jr., deceased, late of Chambersburg, Pa., by Phyllis A. Parker, executrix, Chambersburg, Pa.

Application November 17, 1953, Serial No. 392,694

1 Claim. (Cl. 73—2)

The present invention relates to a device for testing speedometers and more particularly to a device for testing automobile speedometers and for measuring the actual road speed of self-propelled vehicles and for comparing the actual road speed of self-propelled vehicles with the speedometer reading and for comparing actual road distance a vehicle travels with the vehicle mileage distance meter.

Heretofore the laws of many of the States required inspection of motor vehicles for determining the question of whether the vehicle was safe for operation on the highways. These tests have included tests for the brakes, lights, warning signals, etc. and have ordinarily not included a test of the speedometer. It has been difficult to properly test a speedometer without removal of the same from the automobile and therefore this test has not been required. However, for the safe operation of a motor vehicle it is essential that the operator thereof be appraised of the exact speed to avoid unnecessary skids and to safely control a vehicle on the crowded highways.

An object of the present invention is to provide means for testing the speedometer of a motor vehicle without requiring removal of the speedometer mechanism and without unduly inconveniencing the owner of such vehicle.

Another object of the invention is to provide a device which will accurately check the operation of a speedometer so that the owner of the vehicle as well as the attendants testing the same can observe the operation thereof and compare with a known standard.

A further object is to provide a testing device which is simple to operate, relatively inexpensive to construct, and substantial for trouble free use over an extended period of time.

The present invention relates to a speedometer testing device comprising supporting structure on which two parallel shafts are rotatively mounted and a pair of drums on each shaft cooperating with corresponding drums on the other shaft for supporting the driving wheels of a vehicle on such drums. Suitable means which may include a ramp or a floor plate serve to afford a support for a vehicle while it is moved onto the drums of the testing device, and a device for measuring the actual road speed of a self-propelled vehicle and the accuracy of the meter recording distance traveled. A manually operated brake or locking device is provided for preventing rotation of the drums to permit a vehicle to be driven onto or off of the testing device. A meter which may be an accurately calibrated speedometer is positively connected by means of a flexible shaft to one of the shafts of the testing device to accurately measure the peripheral speed of the drums and thereby give an accurate reading of the speed of the vehicle. The flexible shaft is made of sufficient length so that the meter of the testing device may be placed closely adjacent to the speedometer of the vehicle for accurately comparing the readings of the vehicle's speedometer with the testing meter and thereby giving an accurate picture of the speedometer's operation.

Further objects and advantages of the present invention will be apparent upon reference to the drawings wherein:

Figure 1 is a plan view of one form of the testing device with the floor plate omitted and with the structure mounted below the floor level;

Figure 2, a section taken substantially on line 2—2 of Figure 1 showing the testing device in elevation and the floor plate in section;

Figure 3, an end view of a modification in which the testing device is positioned upon the floor and ramps are provided so the vehicle may be driven upon and removed from the testing device;

Figure 4, an end elevation of another modification in which the vehicle is driven on and removed over the same ramp with a stop to prevent a vehicle from moving beyond the testing position and showing one form of brake or locking device.

Figure 5, a section on the line 5—5 of Figure 6 showing a modified form of brake or locking device; and Figure 6, a plan view of a portion of the modified brake structure or locking device.

Referring in detail to the drawing wherein like reference numerals designate like parts, a section of the floor 10 is provided with a recess or pit 11 for receiving the speedometer testing device and a cover plate 12 provided with openings for some parts covers substantially the entire recess.

Two pairs of supporting I-beams 13 are arranged in substantially parallel relation and lying in substantially the same plane and resting upon the bottom of the recess 11. I-beams 13 may be maintained in a definite spaced relation by means of one or more transverse members 14 secured to the ends of the I-beams. A pair of shafts 15 and 16 arranged in spaced parallel relationship transversely of the beams 13 are mounted in bearings 17 on the beams so that each beam carries a bearing 17 for supporting each shaft. Such bearings may be of the anti-friction variety and are adapted to take any thrust which may be applied to the shafts. A drum 18 is fixed on each shaft between each outside beam 13 and the adjacent intermediate beam so that each drum rotates at the same speed as the shaft on which it is mounted. A more or less conventional speed indicator 19 having an extremely high degree of accuracy is drivingly connected to one of the shafts such as shaft 16 by means of a flexible shaft 20 rotatable in a conventional flexible casing 21 and the relation between the speed indicator and the drums is such that the peripheral speed of the drum is indicated on the speed indicator in terms of miles per hour which corresponds to the usual speedometer indication. It will be noted that the cover plate 12 is substantially at the floor level and a vehicle may be run on the floor and over such cover plate 12 onto the drums 18 and the vehicle wheels drop between the cooperating drums 18 to the position shown in phantom lines and are retained therein by the force of gravity. However, it is considered advisable to block the other wheels of the vehicle to prevent the vehicle running off the drums while a test is in progress.

To prevent driven wheels of the vehicle from moving axially along the drums any objectionable amount, a wheel guide generally designated 22 is mounted on the outside I-beams and includes an upright portion 23 which carries outwardly diverging flanges for guiding the wheels of the vehicle onto the drums 18 in the event of a slight disalignment. In the uprights 23 are mounted rollers 25 which rotate about a vertical axis and may contact the wheel or the tire of the vehicle in the event such wheel or tire is moving off the end of the drum.

When a vehicle is being driven onto the testing device it is desirable that the drums be prevented from rotating and this is particularly essential when driving the vehicle off the drums since the freely rotating drums will not provide a tractive force for the necessary movement of the vehicle. To overcome this problem a brake or locking device is provided for preventing rotation of the drums and in one form includes a shaft 26 rotatively mounted in bearings 27, on an outside and an adjacent intermediate supporting beam 13 and such shaft 26 includes a portion extending outwardly beyond the outside beam with a handle 28 fixed to the shaft 26 for positively rotating the same which handle may include an angular extension 29. An eccentric 30 is fixedly mounted on the shaft 26 between the beams 13 and a brake support 31 is movable toward and from the adjacent brake drums 18 and such brake support carries brake shoes 32 for engagement with the drum, a brace 33 extends between the outside and intermediate beam and a cross member 34 is positioned above eccentric 30 while adjustable elements such as bolts 35 located on opposite sides of the brake shaft extend through openings in said brace 33 and adjustably secure the cross member 34 to the brake support 31 thereby providing a brake for controlling the rotation of brake drums 18 by means of operating handle 28. Adjustments for wear may be made by bolts 35 in an obvious manner.

Referring to Figure 3, a structure generally similar to that described above is illustrated but the beams 36 are elongated and ramps 37 and 38 provided with angle guides 39 and 40 are supported by means of uprights 41 so that the testing device may be mounted directly on the floor without requiring a recess or pit and the vehicle may be driven to the testing device up ramp 37 and may be removed down ramp 38 thereby making it possible to test one vehicle after another in the assembly line method. A brake lever 28 and edge guide 22 are substantially the same as that described above.

In Figure 4 a modification is shown in which a single ramp 42 is supported by suitable uprights from the usual beam construction and a cross member 43 and an angle cross member 44 maintain the supporting beams in fixed relation. Upright angle bars 45 positioned adjacent each end of the rear drum 18 and are fixed to angle cross member 44 and carry a cross angle member 46 at a height above the drum and such cross angle member 46 serves as a stop to prevent a vehicle from being driven off the rear drum 18 in the event of excessive speed in driving onto the testing device.

Referring to Figures 5 and 6 a modified form of brake is shown and includes a pair of gearlike elements 47, 48 mounted on shafts 15 and 16 respectively, intermediate the drums. A slide 49 is mounted for movement parallel with the axes of shafts 15 and 16 by means of a strap 50 overlying and straddling slide 49 and secured to an intermediate I-beam 13. Adjacent the inner end of slide 49 is a cross bar 51 provided with extensions for engaging the teeth of the gear-shaped elements 47 and 48. An operating rod 52 is fixed to the slide 49 and passes through the upright portion 23 of the wheel guide 22 and terminates in a handle 53 which may be bent from the rod 52 so that the slide 49 and the cross bar 51 may be controlled from the outside to lock the drums from rotation when the vehicle is driven on or off of the testing device.

It will be evident that applicant has provided a convenient speedometer testing device which is ready for operation with a minimum of effort and speedometers may be accurately checked and compared with a standard speed indicator 19 thereby making it possible for police officials as well as private individuals to check the accuracy of the vehicles' speedometers.

It will be obvious that changes may be made in the construction of the device and such changes are contemplated within the scope of the appended claim.

What is claimed is:

A speedometer testing device comprising supporting beams arranged in parallel relation, and lying in substantially the same plane, a pair of shafts arranged in spaced parallel relationship transversely of above and rotatably mounted in bearings on said beams, a drum fixed on each shaft, a speed indicator, a flexible shaft connecting said speed indicator to one of said shafts to indicate the peripheral speed of said drums, a brake shaft rotatably mounted in bearings on said beams, a handle fixed to said brake shaft outwardly of said beams for rotating the brake shaft, an eccentric fixed on said brake shaft between said beams, a brake support between said beams and movable toward and away from said drums, brake shoes mounted on said brake support for engagement with said drums, a cross member above said eccentric, a pair of elements on opposite sides of said brake shaft and extending through said cross member and secured to said brake support, the effective distance between said cross member and said brake support being adjustable by said elements for compensating for wear of said brake shoes, means for rotating said brake shaft to operate said brake, a wheel guide mounted on each outside beam, said wheel guide including an upright secured to its associated outside beam and a cross member having outwardly flaring portions diverging outwardly of the testing device, and mounted in said wheel guide for contacting the edge of a wheel preventing the wheel from riding off the end of the drums.

References Cited in the file of this patent

UNITED STATES PATENTS

| | | |
|---|---|---|
| 1,184,159 | Becker | May 23, 1916 |
| 1,303,110 | Pfleeger | May 6, 1919 |
| 1,782,914 | Townsend | Nov. 25, 1930 |
| 1,871,053 | Haeberle et al. | Aug. 9, 1932 |
| 1,872,123 | Cowdrey | Aug. 16, 1932 |
| 1,946,101 | Norton | Feb. 6, 1934 |
| 2,009,456 | Shroyer | July 30, 1935 |
| 2,058,205 | Bandura | Oct. 20, 1936 |
| 2,110,227 | Koenigkramer et al. | Mar. 8, 1938 |
| 2,248,938 | Bennett | July 15, 1941 |
| 2,601,187 | Volis | June 17, 1952 |
| 2,607,212 | Rose | Aug. 19, 1952 |
| 2,709,362 | Marcus et al. | May 31, 1955 |

FOREIGN PATENTS

| | | |
|---|---|---|
| 485,929 | Great Britain | May 24, 1938 |